US010460537B2

(12) United States Patent
Natsuno et al.

(10) Patent No.: US 10,460,537 B2
(45) Date of Patent: Oct. 29, 2019

(54) GATE CONTROL METHOD, AUTHENTICATION DEVICE, AND GATE CONTROL SYSTEM

(71) Applicant: TECHFIRM INC., Tokyo (JP)

(72) Inventors: Takeshi Natsuno, Tokyo (JP); Yuichiro Tsutsui, Tokyo (JP)

(73) Assignee: TECHFIRM INC., Tokyo (JP)

( * ) Notice: Subject to any disclaimer, the term of this patent is extended or adjusted under 35 U.S.C. 154(b) by 205 days.

(21) Appl. No.: 15/489,785

(22) Filed: Apr. 18, 2017

(65) Prior Publication Data
US 2017/0221286 A1 Aug. 3, 2017

Related U.S. Application Data

(63) Continuation of application No. PCT/JP2015/079006, filed on Oct. 14, 2015.

(30) Foreign Application Priority Data

Oct. 22, 2014 (JP) ................. 2014-215010

(51) Int. Cl.
G07F 17/32 (2006.01)
G07C 9/00 (2006.01)
G06Q 20/40 (2012.01)
G06Q 50/10 (2012.01)

(52) U.S. Cl.
CPC ....... *G07C 9/00031* (2013.01); *G06Q 20/409* (2013.01); *G06Q 50/10* (2013.01); *G07C 9/00103* (2013.01); *G07F 17/3239* (2013.01); *G07F 17/3241* (2013.01); *G07F 17/3244* (2013.01)

(58) Field of Classification Search
USPC .......................................... 463/29
See application file for complete search history.

(56) References Cited

U.S. PATENT DOCUMENTS

2014/0217169 A1* 8/2014 Lewis ................ G07F 19/201
235/379

FOREIGN PATENT DOCUMENTS

| JP | H06240937 A | 8/1994 |
| JP | 2001195620 A | 7/2001 |
| JP | 2002008142 A | 1/2002 |
| JP | 2005007041 A | 1/2005 |

(Continued)

OTHER PUBLICATIONS

International preliminary report on patentability for PCT/JP2015/079006 dated Apr. 25, 2017 for ISA/JP.

(Continued)

*Primary Examiner* — Pierre E Elisca
(74) *Attorney, Agent, or Firm* — Basil M. Angelo; Angelo IP

(57) ABSTRACT

A gate control system includes an authentication device and a gate control device. The authentication device specifies a card number of a credit card of a user of a gaming facility, performs a credit inquiry of the credit card using the card number, and transmits permission information indicating that the gate should be opened to the gate control device when a result of the credit inquiry indicates that using the credit card is approved. Upon receiving the permission information from the authentication device, the gate control device opens the gate.

12 Claims, 7 Drawing Sheets

(56) References Cited

FOREIGN PATENT DOCUMENTS

| JP | 2005025396 A | 1/2005 |
|---|---|---|
| JP | 2005149362 A | 6/2005 |

OTHER PUBLICATIONS

International publication with international search report for PCT/JP2015/079006 dated Dec. 8, 2015 for ISA/JP.
Korean office action for corresponding Korean patent application serial No. KR 10-2017-7004589 by inventor Natsuno et al, dated Apr. 16, 2019.

* cited by examiner

GATE CONTROL METHOD, AUTHENTICATION DEVICE, AND GATE CONTROL SYSTEM

CROSS-REFERENCE TO RELATED APPLICATIONS

The present application is a continuation application of International Application number PCT/JP2015/079006, filed on Oct. 14, 2015, which claims priority under 35 U.S.C. § 119(a) to Japanese Patent Application No. 2014-215010, filed on Oct. 22, 2014. The content of this application is incorporated herein by reference in their entirety.

BACKGROUND OF THE INVENTION

Conventionally, a system for restricting unescorted minors, illegal players, and the like from entering a gaming facility such as a casino is known. For example, Japanese Unexamined Patent Application Publication No. 2005-007041 discloses a visitor management system that issues a registration card indicating various pieces of authentication data for specifying a person who wishes to enter a casino floor is registered in a registration system, and manages entrances onto the casino floor on the basis of the various pieces of authentication data such as a name, a date of birth, an address, and data for identity verification of the visitor registered in the registration card.

Recently, gambling addiction has become a problem. However, the visitor management system described in Japanese Unexamined Patent Application Publication No. 2005-007041 only manages a visitor's entrance on the basis of the various pieces of authentication data such as the name, the date of birth, the address, and the data for identity verification of the visitor registered in the registration card, and there was a problem that it was not possible to restrict entrance of a person who is not suitable for entering a gaming facility due to a gambling addiction problem.

BRIEF SUMMARY OF THE INVENTION

A gate control method according to the first aspect of the present invention is a gate control method for controlling opening and closing of a gate for entering a facility, the method comprising the steps of specifying a card number of a credit card of a user of the facility, and performing a credit inquiry of the credit card using the card number and opening the gate when a result of the credit inquiry indicates an approval of using the credit card.

The gate control method may further comprises the step of acquiring, from the membership card of the user, user identification information for identifying the user that is attached to the membership card, wherein the number specifying step may specify the card number associated with the user identification information.

The door-opening step may open the gate when determining that an expiration date of the credit card associated with the specified card number has not expired and that using the credit card was approved by the credit inquiry within a first period before the point in time when the card number was specified.

The door-opening step may open the gate when determining that the expiration date of the credit card associated with the specified card number has not expired by updating the expiration date even if the expiration date was determined to be expired in the past.

The door-opening step does not have to open the gate when using the credit card is not approved by the credit inquiry within a second period before the point in time when the card number was specified, even if it was determined that the expiration date of the credit card has not expired and using the credit card was approved by the credit inquiry within the first period.

The door-opening step does not have to open the gate when the door-opening condition of the gate associated with the specified card number is not satisfied, even if it was determined that the expiration date of the credit card has not expired and the credit inquiry was performed within the first period.

The door-opening step may provide notification of a reason for not opening the gate when the door-opening condition is not satisfied. The door-opening condition includes a self-control condition that can be set by the user, and the gate control method may further comprise the step of receiving a setting of the self-control condition from the user.

The gate control method may further comprise the first notification step that receives a scheduled time to enter the facility from the user and provides notification of information indicating whether or not entrance into the facility at the scheduled time of entry is possible on the basis of the door-opening condition.

The gate control method may further comprise the second notification step that provides notification of the fact that the user is in the gaming facility to a contact address of a partner of the user when the door-opening step determines whether or not to open the gate.

The door-opening step does not have to open the gate when the amount of money used by the user within a predetermined period in the facility and the credit limit of the credit card are within a predetermined range.

The gate control method may further comprise the third notification step that notifies the user that the credit inquiry of the credit card is required when a third period that is shorter than the first period has elapsed from the last credit inquiry of the credit card.

An authentication device according to the second aspect of the present invention is an authentication device connected to a gate control device for controlling opening and closing of a gate for entering a facility in a manner enabling communication, the device comprising a specifying part that specifies a card number of a credit card of a user of the facility, and an authentication processing part that performs a credit inquiry of the credit card using the card number and transmits permission information indicating that the gate should be opened to the gate control device when a result of the credit inquiry indicates that using the credit card is approved.

A gate control system according to the third aspect of the present invention is a gate control system comprising a gate control device for controlling opening and closing of a gate for entering a facility and an authentication device connected to the gate control device in a manner enabling communication, wherein the authentication device includes a specifying part that specifies a card number of a credit card of a user of the facility, and an authentication processing part that performs a credit inquiry of the credit card using the card number and transmits permission information indicating that the gate should be opened to the gate control device when a result of the credit inquiry indicates that using the credit card is approved, and the gate control device includes an opening-closing control part that opens the gate upon receiving the permission information from the authentication device.

DETAILED DESCRIPTION OF THE INVENTION

Hereinafter, exemplary embodiments of the present invention will be described.

[Outline of a Gate Control System S]

Figure 1:
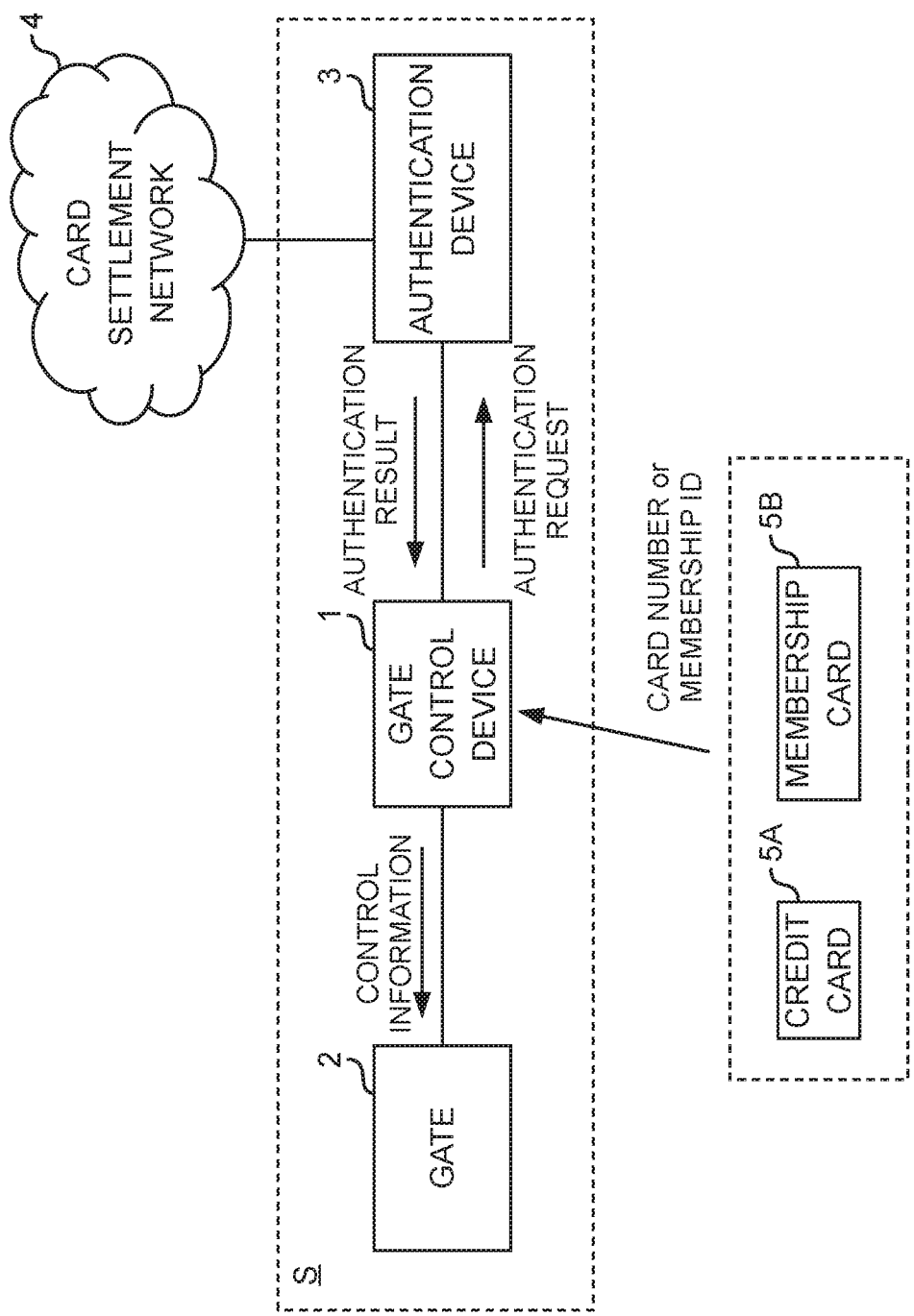
FIG. 1 is a diagram showing an outline of a gate control system according to the present exemplary embodiment.

FIG. 1 is a diagram showing an outline of a gate control system S according to the present exemplary embodiment. The gate control system S includes a gate control device 1, a gate 2, and an authentication device 3, and is a system for controlling the opening of the gate 2 provided at an entrance or the like in a gaming facility such as a casino.

For example, the gate control device 1 is installed adjacent to the gate 2. It should be noted that a plurality of gates 2 may be provided at an entrance or the like in the gaming facility. In this case, the gate control device 1 is provided corresponding to each of the plurality of gates 2.

The gate control device 1 reads i) a card number stored in a credit card 5A owned by a user in the gaming facility or ii) a member identification (ID) attached to a membership card 5B issued to the user in the gaming facility as user identification information for identifying the user. The gate control device 1 requests the authentication device 3 to authenticate the user on the basis of the read information.

For example, the authentication device 3 is installed in a management room or the like provided in the gaming facility, and is connected to the gate control device 1 in a manner enabling communication. When the gate control system S has a plurality of gate control devices 1, the authentication device 3 transmits and receives data to and from the plurality of gate control devices 1. The authentication device 3 performs authentication in response to the reception of an authentication request from the gate control device 1, and transmits information indicating an authentication result to the gate control device 1. The gate control device 1 performs door-opening control of the gate 2 on the basis of the information indicating the authentication result. Hereinafter, the functions of the gate control device 1 and the authentication device 3 will be described in detail.

[Configuration of the Gate Control Device 1]

Figure 2:
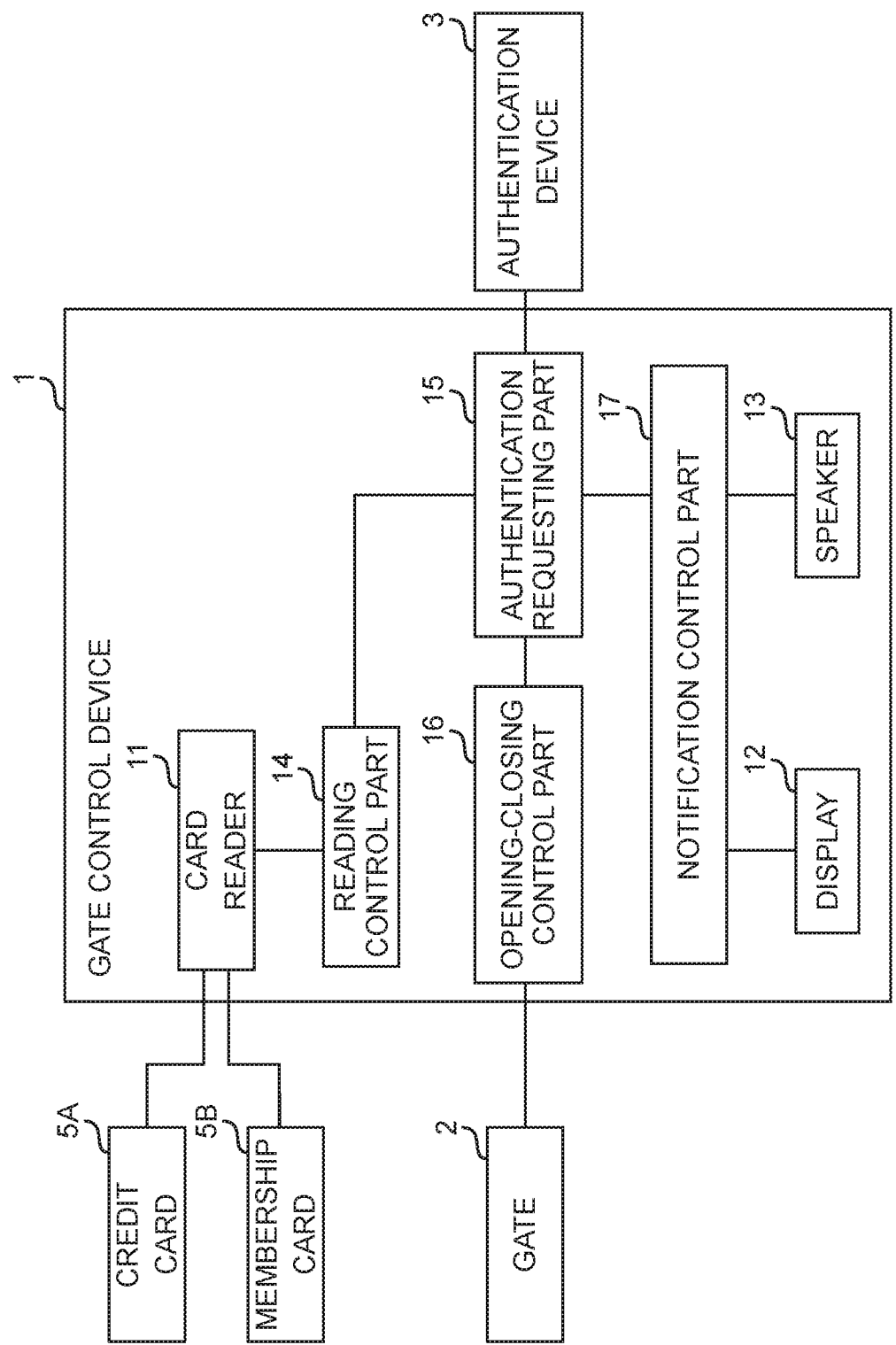
FIG. 2 is a diagram showing a configuration of a gate control device according to the present exemplary embodiment.

FIG. 2 is a diagram showing a configuration of the gate control device 1 according to the present exemplary embodiment. The gate control device 1 includes a card reader 11, a display 12, a speaker 13, a reading control part 14, an authentication request part 15, an opening-closing control part 16, and a notification control part 17.

The card reader 11 reads the credit card number stored in the credit card 5A and the member ID stored in the membership card 5B. The card reader 11 outputs the read information to the reading control part 14.

The display 12 includes, for example, a liquid crystal display, an organic electro-luminescence (EL) display, or the like and a touch panel. The display 12, for example, displays a message indicating that the authentication process is in progress and a warning indicating that the user is not permitted to enter under the control of the notification control part 17. Further, the display 12 displays a release button for turning off the warning, and turns off the warning in response to an operation of to g the release button detected by the touch panel.

The speaker 13 outputs, for example, a sound indicating that the user's authentication is completed and an alarm sound indicating that the user is not permitted to enter the facility under the control of the notification control part 17. It should be noted that the card reader 11, the display 12, and the speaker 13 do not have to be provided in the gate control device 1 and may be external devices connected to the gate control device 1.

The reading control part 14, the authentication request part 15, the opening-closing control part 16, and the notification control part 17 include, for example, a CPU. When the gate 2 is in a closed state, the reading control part 14 acquires the card number of the credit card 5A used by the user or the member ID that is attached to the membership card 5B from the card reader 11.

The authentication request part 15 transmits the authentication request to the authentication device 3. The authentication request includes the card number or the member ID acquired by the reading control part 14, The authentication request part 15 receives the information indicating the authentication result from the authentication device 3. The authentication request part 15 outputs the information indicating the authentication result to the opening-closing control part 16 and the notification control part 17.

When the opening-closing control part 16 acquires information indicating the authentication result from the authentication request part 15, the opening-closing control part 16 determines whether or not to open the gate 2 on the basis of the information. Specifically, the opening-closing control part 16 opens the gate 2 when the information indicating the authentication result is permission information for permitting the gate 2 to be opened. Further, the opening-closing control part 16 does not open the gate 2 when the information indicating the authentication result is non-permission information for not permitting the gate 2 to be opened.

In response to the authentication request part 15 acquiring the card number or the member ID from the reading control part 14, the notification control part 17 causes the display 12 to display information indicating that authentication is being performed.

Further, when the notification control part 17 acquires the information indicating the authentication result from the authentication request part 15, the notification control part 17 controls the display 12 and the speaker 13 on the basis of the information to provide notification of the authentication result. Specifically, when the information indicating the authentication result is the permission information for permitting the gate 2 to be opened, the notification control part 17 causes the display 12 to display a message indicating that the opening of the gate 2 is permitted and causes the speaker 13 to output a sound indicating that permission has been granted. Furthermore, when the information indicating the authentication result is the non-permission information for not permitting the gate 2 to be opened, the notification control part 17 causes the display 12 to display a warning message and causes the speaker 13 to output an alarm sound.

[Configuration of the Authentication Device 3]

Figure 3:
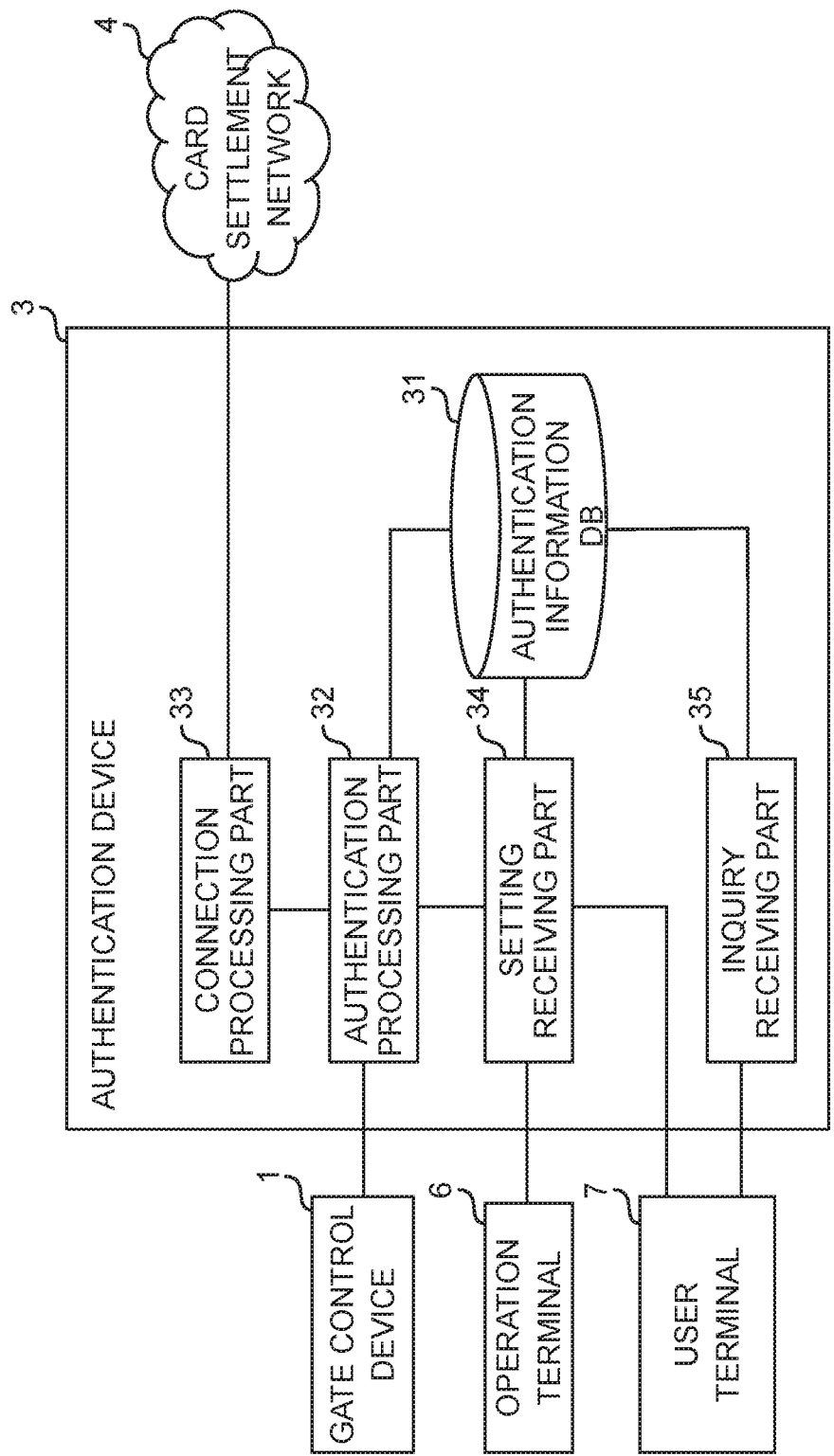
FIG. 3 is a diagram showing a configuration of an authentication device according to the present exemplary embodiment.

FIG. 3 is a diagram showing a configuration of the authentication device 3 according to the present exemplary embodiment. The authentication device 3 includes an authentication information DB 31, an authentication processing part 32, a connection processing part 33, a setting receiving part 34, and an inquiry receiving part 35.

Figure 4:
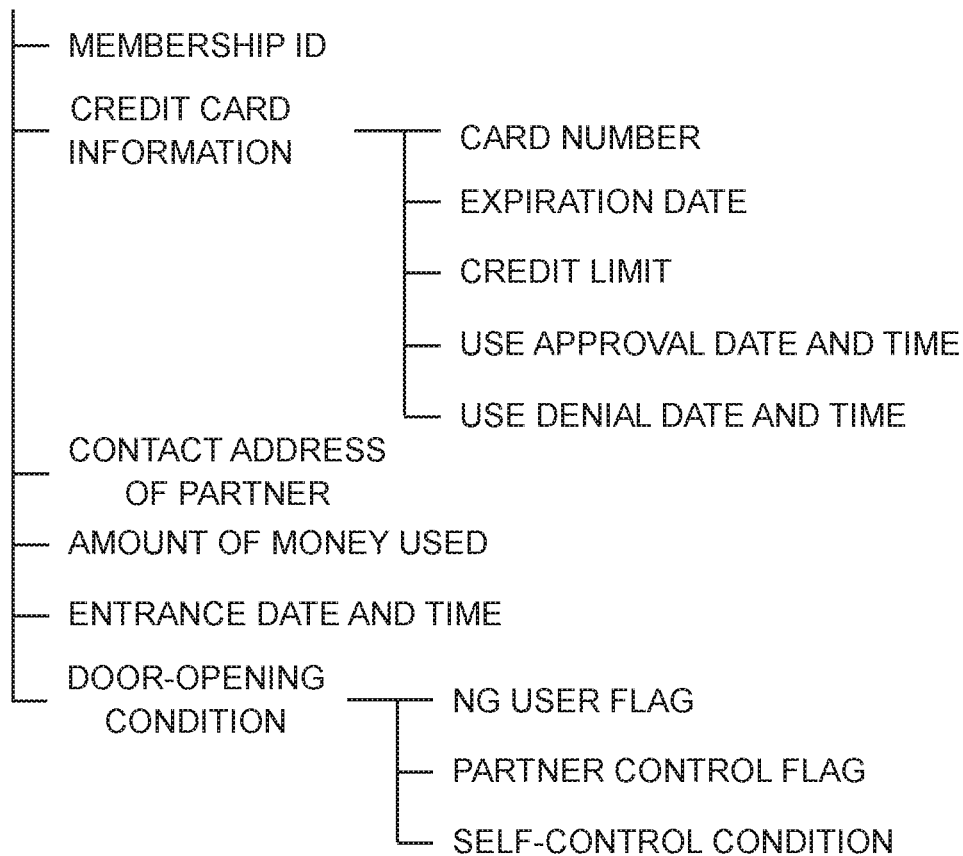
FIG. 4 is a diagram showing an example of information stored in authentication information according to the present exemplary embodiment.

The authentication information DB 31 stores authentication information related to user authentication. FIG. 4 is a diagram showing various items included in the authentication information stored in the authentication information DB 31 according to the present exemplary embodiment. As shown in FIG. 4, the authentication information includes a member ID, credit card information indicating information on a credit card, a contact address of a user's partner, a paid amount indicating the amount of money used by the user of the facility, an entrance date and time indicating the date and time when the user last entered the facility, and a door-opening condition which is a condition for opening the gate 2 that are stored in association with each other.

The credit card information includes the card number of the credit card 5A, an expiration date, a credit limit, a use approval date and time, and a use denial date and time. The use approval date and time is the date and time when using the credit card 5A was approved. The use denial date and time is the date and time when using the credit card 5A was not approved. The card number, the expiration date, and the credit limit are stored when a user is newly registered at the gaming facility.

The use approval date and time is the date and time when using the credit card 5A was last approved as a result of a credit inquiry of the credit card 5A performed by the below-described authentication processing part 32. The use approval date and time are updated according to the approval of use of the credit card 5A.

The use denial date and time is the date and time when using the credit card 5A was last denied as a result of the credit inquiry of the credit card 5A performed by the below-described authentication processing part 32. The use denial date and time are updated according to the denial of use of the credit card 5A.

The door-opening condition includes, for example, an NG user flag, a partner control flag, and a self-control condition. The NG user flag is a flag indicating whether or not the user is an NG user who is prohibited from using the gaming facility. For example, the NG user flag takes binary values of "0" and "1." When the value of the NG user flag is "0," it indicates that the user is not an NG user. When the value of the NG user flag is "1," it indicates that the user is an NG user and the user is prohibited from entering into the gaming facility.

The partner control flag is a flag indicating whether or not the user is restricted from entering the gaming facility by a person related to the user (for example, the family of the user). For example, the partner control flag takes binary values of "0" and "1." When the value of the partner control flag is "0," it indicates that the user is permitted to enter the facility by the related person. When the value of the partner control flag is "1," it indicates that the user is prohibited from entering the gaming facility by the related person.

The self-control condition is an admission condition which can be set by the user himself/herself. For example, a frequency with which the user enters the facility (for example, once every three days) and an amount of money that the user can use within a predetermined period in the gaming facility (for example, 50,000 yen per month) are set for the self-control condition.

In response to the reception of the authentication request from the gate control device 1, the authentication processing part 32 performs an authentication process and transmits information indicating an authentication result to the gate control device 1. Specifically, first, the authentication processing part 32 functions as a specifying part and specifies the card number of the credit card 5A on the basis of the information included in the authentication request. The authentication processing part 32 determines whether the information included in the authentication request is the card number of the credit card 5A or the member ID of the membership card 5B. When the authentication processing part 32 determines that the information included in the authentication request is the member ID of the membership card 5B, the authentication processing part 32 specifies the card number of the credit card 5A associated with the member ID by referencing the authentication information DB 31.

The authentication processing part 32 can determine whether or not to open the gate 2 by a plurality of determination methods. Hereinafter, details of the plurality of determination methods for determining whether or not to open the gate 2 will be described.

[Determination Based on a Result of the Credit Inquiry]

The authentication processing part 32 determines whether or not to open the gate 2 on the basis of a result of the credit inquiry f the credit card 5A. The credit inquiry is a process for inquiring whether or not the credit card 5A is available by connecting to a management system (not shown in figures) for managing the credit information of the user of the credit card 5A. Specifically, the authentication processing part 32 controls the connection processing part 33 connected to the management system via a card settlement network 4 to connect to the management system. Then, the authentication processing part 32 performs a credit inquiry for inquiring whether or not the credit card 5A corresponding to the card number is available, and obtains the result of the credit inquiry.

When the result of the credit inquiry indicates that using the credit card 5A is approved, the authentication processing part 32 transmits the permission information to the gate control device 1 as information indicating the authentication result, in order to cause the gate control device 1 to open the gate 2. Further, when the result of the credit inquiry indicates that using the credit card 5A is approved, the authentication processing part 32 updates the use approval date and time stored in the authentication information DB 31. When the result of the credit inquiry indicates that using the credit card 5A is not approved, the authentication processing part 32 transmits the non-permission information indicating that the gate 2 is not to be opened to the gate control device 1. Further, when the result of the credit inquiry indicates that using the credit card 5A is not approved, the authentication processing part 32 updates the use denial date and time stored in the authentication information DB 31.

[Determination Based on a Result of a Past Credit Inquiry]

The authentication processing part 32 may determine whether or not to open the gate 2 on the basis of a result of a credit inquiry of the credit card 5A in the past. Specifically, the authentication processing part 32 references the use approval date and time in the authentication information DB 31 and determines whether or not the use was approved in the credit inquiry within a first period (for example, within 30 days) before the point in time at which the authentication processing part 32 specifies the card number. When it is determined that the use was approved in the credit inquiry within the first period, the authentication processing part 32 transmits the permission information to the gate control device 1. In this manner, even when the user does not bring the credit card 5A but brings only the membership card 5B, the authentication processing part 32 can perform the credit inquiry of the user on the basis of the member ID corresponding to the membership card 5B.

Here, the authentication processing part 32 references the use denial date and time in the authentication information DB 31, and when using the credit card was not approved by the credit inquiry within a second period (for example, within 60 days) before the point in time at which the card number is acquired, the authentication processing part 32 may cause the gate control device 1 not to open the gate 2 even when the authentication processing part 32 determines that the expiration date of the credit card 5A has not expired and using the credit card was approved by the credit inquiry within the first period. When the use was not approved in the credit inquiry within the second period, it is predicted that the user is in a financial shortage and is not suitable for using the gaming facility. In this case, the authentication device 3 can prevent entry of such a user. By making the second period longer than the first period, the authentication processing section 32 can regulate the entry of the user by placing greater emphasis on the fact that the use was not approved rather than the fact that the use was approved in the credit inquiry.

Further, the second period may be shorter than the first period. For example, the authentication processing part 32 may cause the gate control device 1 not to open the gate 2 in a case where the use was not approved in the credit inquiry within the second period (for example, within 20 days) even if the use was approved in the credit inquiry within the first period (for example, within 30 days). In this manner, the authentication processing part 32 can regulate entry of the user by emphasizing the fact that the use was not approved within the second period, which is closer to the day the user intends to enter the facility, even if the use was approved within the first period.

Furthermore, the authentication processing part 32 may determine whether or not to open the gate 2 on the basis of the result of the last credit inquiry. Specifically, the authentication processing part 32 may cause the gate control device 1 not to open the gate 2 when the use denial date and time in the authentication information DB 31 is newer than the use approval date and time. In this manner, the authentication processing part 32 can determine whether or not to let the user enter the facility on the basis of the latest situation of the user.

Here, there is a problem that the credit information of the user cannot be sufficiently confirmed in a case where the user once enters the gaming facility by performing a credit inquiry of the credit card 5A and then the user enters the gaming facility by using the membership card 5B without using the credit card 5A. Therefore, the authentication processing part 32 may notify the user that the credit inquiry of the credit card 5A is required when a third period (for example, 20 days) that is shorter than the first period has elapsed after the last credit inquiry of the credit card. For example, the authentication processing part 32 may notify the user by sending notification information indicating that the credit inquiry of the credit card is required to the gate control device 1. In this manner, the authentication device 3 can cause the user to recognize that entering the gaming facility by using the credit card 5A is required. Accordingly, the authentication device 3 can prevent the user from being unable to enter the gaming facility due to not having brought the credit card 5A.

[Determination Based on the Expiration Date of the Credit Card 5A]

The authentication processing part 32 may further use the expiration date of the credit card 5A in determining whether or not to open the gate 2. For example, before performing the credit inquiry of the credit card 5A or before referring to the result of the past credit inquiry of the credit card 5A, the authentication processing part 32 determines whether or not the expiration date of the credit card 5A associated with the specified card number has expired. When the authentication processing part 32 determines that the expiration date of the credit card 5A has expired, the authentication processing part 32 transmits the non-permission information to the gate control device 1 as the information indicating the authentication result, even when the use was approved in the past credit inquiry. The non-permission information indicates that the gate 2 should not be opened.

Here, the authentication processing part 32 may cause the authentication information DB 31 to store the determination result concerning whether or not the expiration date has expired and the time at which the determination was made in association with each other. Then, when the authentication processing part 32 determines that the expiration date expired in the past on the basis of the stored information, the authentication processing part 32 may cause the gate control device 1 not to open the gate 2.

Further, the authentication processing part 32 may cause the gate control device 1 to open the gate 2 when the authentication processing part 32 determines that the expiration date of the credit card 5A associated with the specified card number has not expired by updating the expiration date stored in the authentication information DB 31 even when the authentication processing part 32 determined that the expiration date expired in the past. Because the relation between the expiration of the expiration date and the user's credit information is low, it is preferable that the authentication device 3 does not permit the user to enter the facility again based on the fact that the user was not able to enter the facility in the past due to the expiration of the expiration date.

[Determination Based on the Door-Opening Condition]

Further, the authentication processing part 32 may determine whether or not to open the gate 2 further on the basis of conditions other than the result of the credit inquiry of the credit card 5A. For example, the authentication processing part 32 determines whether or not to open the gate 2 on the basis of at least any of an NG user flag, a partner control flag, and a self-control condition as the door-opening condition.

Specifically, when the NG user flag included in the door-opening condition is "1," the partner control flag is "1," or the self-control condition is not satisfied, the authentication processing part 32 may determine that the door-opening condition is not satisfied and may cause the gate control device 1 not to open the gate 2. In this way, the authentication device 3 can regulate entry of the user into the gaming facility in accordance with the partner control and the self-control.

When the door-opening condition of the gate 2 is not satisfied, the authentication processing part 32 may provide notification of the reason for not permitting the gate 2 to be opened. For example, when the door-opening condition of the gate 2 is not satisfied, the authentication processing part 32 transmits the non-permission information indicating that the gate 2 is not to be opened to the gate control device 1, and transmits the notification information indicating the reason for not permitting the gate 2 to be opened to the gate control device 1. The notification control part 17 of the gate control device 1 causes the display 12 to display the reason indicated by the notification information in response to the notification information received by the authentication request part 15. In this manner, the user can comprehend the reason why he/she is not permitted to enter the gaming facility and can take an appropriate action.

Further, the authentication processing part 32 may provide notification of the fact that the user is in a gaming facility to the contact address of the partner by referencing the authentication information DB 31 when the authentication processing part 32 determined on whether or not to open the gate 2. In this manner, even when, for example, the user visits the gaining facility without permission from the partner, the partner can comprehend that fact and can take an appropriate action.

[Determination Based on the Credit Limit]

When the amount of money used by the user within a predetermined period in the gaming facility and the credit limit of the credit card 5A are within a predetermined range (for example, within 50,000 yen or the like), the authentication processing part 32 may cause the gate 2 not to be opened. Specifically, the authentication processing part 32 specifies the paid amount and the credit limit of the user corresponding to the specified card number by referencing the authentication information DB 31. Then, when the specified paid amount and the specified credit amount are within the predetermined range, the authentication processing part 32 may transmit the non-permission information indicating that the gate 2 should not be opened to the gate control device 1. In this manner, the authentication device 3 can restrict the user from using too much money in the gaming facility. It should be noted that the amount of money used by the user within the predetermined period in the gaming facility is an amount of money obtained by subtracting the total amount of money returned to the user in a game from the total amount of money used by the user for the game, but it may be simply the total amount of money used for the game in the gaming facility.

[Combining a Plurality of Determination Methods]

In the above description, a plurality of determination methods for determining whether or not to open the gate 2 was described, but the authentication processing part 32 may determine whether or not to open the gate 2 by combining the above-described determination methods.

For example, when the authentication processing part 32 determines that the expiration date of the credit card 5A associated with the specified card number has expired and that using the credit card 5A was approved by the credit inquiry within the first period before the point in time of specifying the card number, the authentication processing part 32 may cause the gate control device 1 to open the gate 2.

The authentication processing part 32 may reference the authentication information DB 31, and when the door-opening condition associated with the specified card number is not satisfied, the authentication processing part 32 may cause the gate control device 1 not to open the gate 2 even when the authentication processing part 32 determined that the expiration date of the credit card 5A has expired and that using the credit card 5A was approved by the credit inquiry within the first period.

The setting receiving part 34 receives the setting of the authentication information from an operation terminal 6 operated by an operator at the front desk or the like of the gaming facility. Specifically, when the setting receiving part 34 receives the card number, the expiration date, and the credit limit of the credit card 5A corresponding to a new user from the operation terminal 6, the setting receiving part 34 generates a member ID. Then, the setting receiving part 34 stores the member ID, the card number, the expiration date, and the credit limit of the credit card 5A in the authentication information DB 31. Further, the setting receiving part 34 controls the authentication processing part 32 and the connection processing part 33 to perform the credit inquiry of the credit card 5A, and updates the use approval date and time or the use denial date and time associated with the member ID on the basis of the result of the credit inquiry.

Furthermore, when the user causes a problem in the gaming facility or the like, the setting receiving part 34 may receive the member ID of the user and an effect of restricting entry of the user into the gaming facility from the operation terminal 6, and may update the NG user flag included in the authentication information stored in the authentication information DB 31.

Moreover, the setting receiving part 34 may receive the member ID and may also receive at least any of the contact address of the partner and the self-control condition from the user terminal 7 operated by the user, and may update the contact address of the partner and the self-control condition included in the authentication information stored in the authentication information DB 31.

In addition, the setting receiving part 34 may receive the member ID of the user and the fact that the partner control is performed from a terminal (not shown in figures) of a related person of the user operated by the related person and may update the partner control flag included in the authentication information stored in the authentication information DB 31.

The inquiry receiving part 35 receives the member ID of the user and the scheduled time to enter the gaming facility from the user terminal 7. In response to the reception of the scheduled time of entry, the inquiry receiving part 35 determines whether or not the user can enter the gaming facility at the scheduled time of entry on the basis of at least any of the credit card information, the entrance date and time, and the door-opening condition stored in the authentication information DB 31. For example, if the allowed frequency of a user's entering the gaming facility is set to once a week in the self-control condition included in the door-opening condition, and if the entrance date and time stored in the authentication information is within one week from the schedule time of entry, the inquiry receiving part 35 determines that the user cannot enter the gaming facility at the scheduled time of entry. The inquiry receiving part 35 notifies the user of the user terminal 7 of the determination result by transmitting the information indicating the determination result to the user terminal 7.

[Sequence Relating to Door-Opening Control of the Gate]

Figure 5:
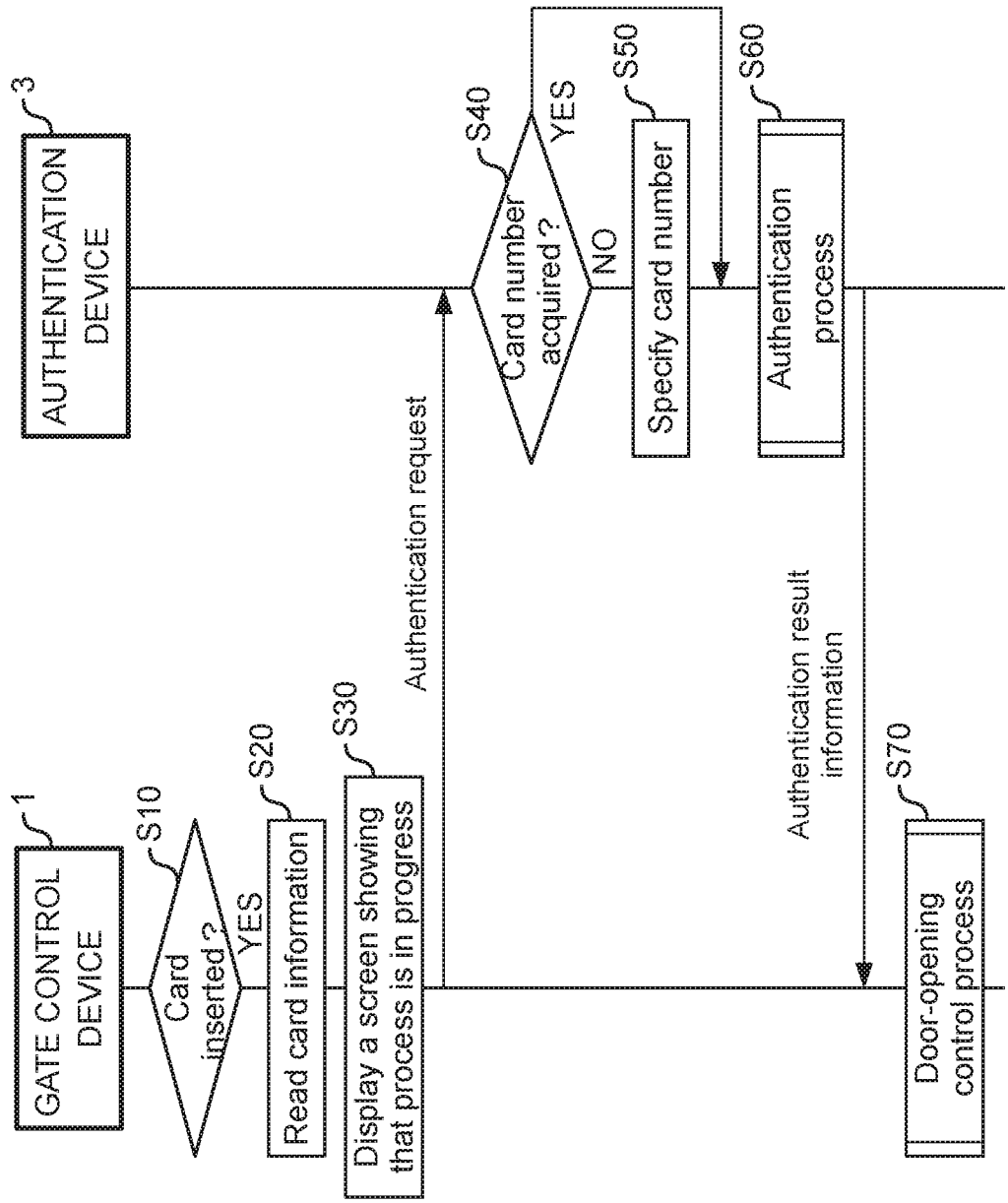
FIG. 5 is a diagram showing an example of a sequence relating to a door-opening control of a gate according to the present exemplary embodiment.

Next, a flow of processing relating to the door-opening control of the gate 2 in the gate control system S will be described. FIG. 5 is a diagram showing an example of a sequence relating to door-opening control of the gate 2.

First, the reading control part 14 determines whether or not the credit card 5A or the membership card 5B is inserted into the card reader 11 (S10). When the reading control part 14 determines that the insertion was made, the reading control part 14 reads the information stored in the inserted credit card 5A or membership card 5B (S20).

Subsequently, after the reading control part 14 reads the information, the notification control part 17 causes the display 12 to display a screen showing that processing is in progress (S30). Then, the authentication request part 15 transmits, to the authentication device 3, an authentication request including the card number or the member ID acquired by the reading control part 14. It should be noted that the order of transmitting the authentication request and displaying the processing on the display 12 is not limited to this order.

Next, the authentication processing part 32 of the authentication device 3 determines whether or not the card number of the credit card 5A was acquired by using the information included in the authentication request (S40). When the authentication processing part 32 determines that the card number has been acquired, the authentication processing part 32 moves the process to S60. When the authentication processing part 32 determines that the card number has not been acquired, the authentication processing part 32 moves the process to S50 because the information included in the authentication request is the member ID. Then, the authentication processing part 32 references the authentication information DB 31 and specifies the card number associated with the member ID.

Subsequently, the authentication processing part 32 executes an authentication process (S60). Details of a processing flow in the authentication process will be described later. After executing the authentication process, the authentication processing part 32 transmits the information indicating the authentication result to the gate control device 1. Upon acquiring the information indicating the authentication result, the opening-closing control part 16 of the gate control device 1 executes the door-opening control process of the gate 2 (S70). Details of the processing flow in the door-opening control process will be described later.

[Flowchart of the Authentication Process]

Figure 6:
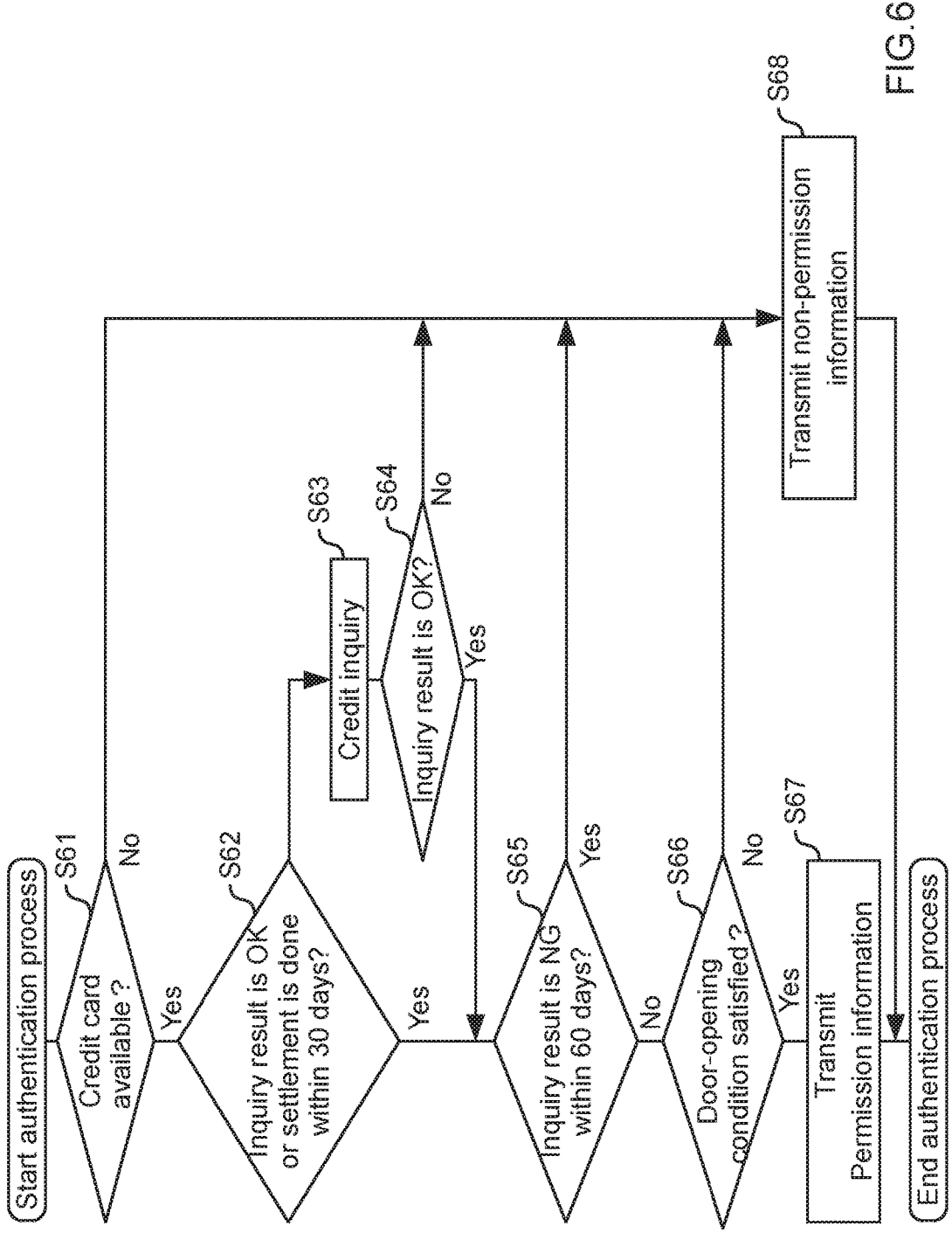
FIG. 6 is a flowchart showing a flow of a process related to an authentication process according to the present exemplary embodiment.

Next, a processing flow related to the authentication process will be described. FIG. 6 is a flowchart showing the flow of the process related to an authentication process.

First, the authentication processing part 32 references the authentication information DB 31 and determines whether or not the credit card 5A corresponding to the card number is available on the basis of the expiration date associated with the specified card number (S61). When the authentication processing part 32 determines that the credit card 5A is effective, the authentication processing part 32 moves the process to S62, and when the authentication processing part 32 determines that the credit card 5A is not effective, the authentication processing part 32 moves the process to S68.

In S62, the authentication processing part 32 references the authentication information DB 31 and determines whether using the credit card 5A was approved in the credit inquiry or a settlement based on the card number was done within 30 days (within the first period) before the point in time when the card number was specified. When the authentication processing part 32 determines that using the credit card 5A was approved in the credit inquiry or the settlement based on the specified card number was done within 30 days, the authentication processing part 32 moves the process to S65. Further, when using the credit card 5A was not approved in the credit inquiry and the settlement based on the specified card number was not done within 30 days, the authentication processing part 32 moves the process to S63.

In S63, the authentication processing part 32 performs the credit inquiry using the specified card number. Subsequently, the authentication processing part 32 determines whether or not the result of the credit inquiry is OK, that is, whether or not using the credit card 5A was approved (S64). When the result of the credit inquiry is OK, the authentication processing part 32 moves the process to S65, and when the result of the credit inquiry is NG, the authentication processing part 32 moves the process to S68.

Then, the authentication processing part 32 references the use denial date and time in the authentication information DB 31, and determines whether or not the result of the credit inquiry is NG within 60 days (within the second period) before the point in time when the card number was acquired (S65). When the authentication processing part 32 determines that the result of the credit inquiry was NG within 60 days, the authentication processing part 32 moves the process to S68. When the authentication processing part 32 determines that the result was not NG within 60 days and the door-opening condition is satisfied (S66), the authentication processing part 32 moves the process to S67.

And then, in order to cause the gate control device 1 to open the gate 2, the authentication processing part 32 transmits, to the gate control device 1, the permission information for permitting the gate 2 to be opened as information indicating the authentication result (S67). On the other hand, in S68, the authentication processing part 32 transmits, to the gate control device 1, the non-permission information indicating that the gate 2 should not be opened as the information indicating the authentication result.

[Flowchart of the Door-Opening Control Process]

Figure 7:
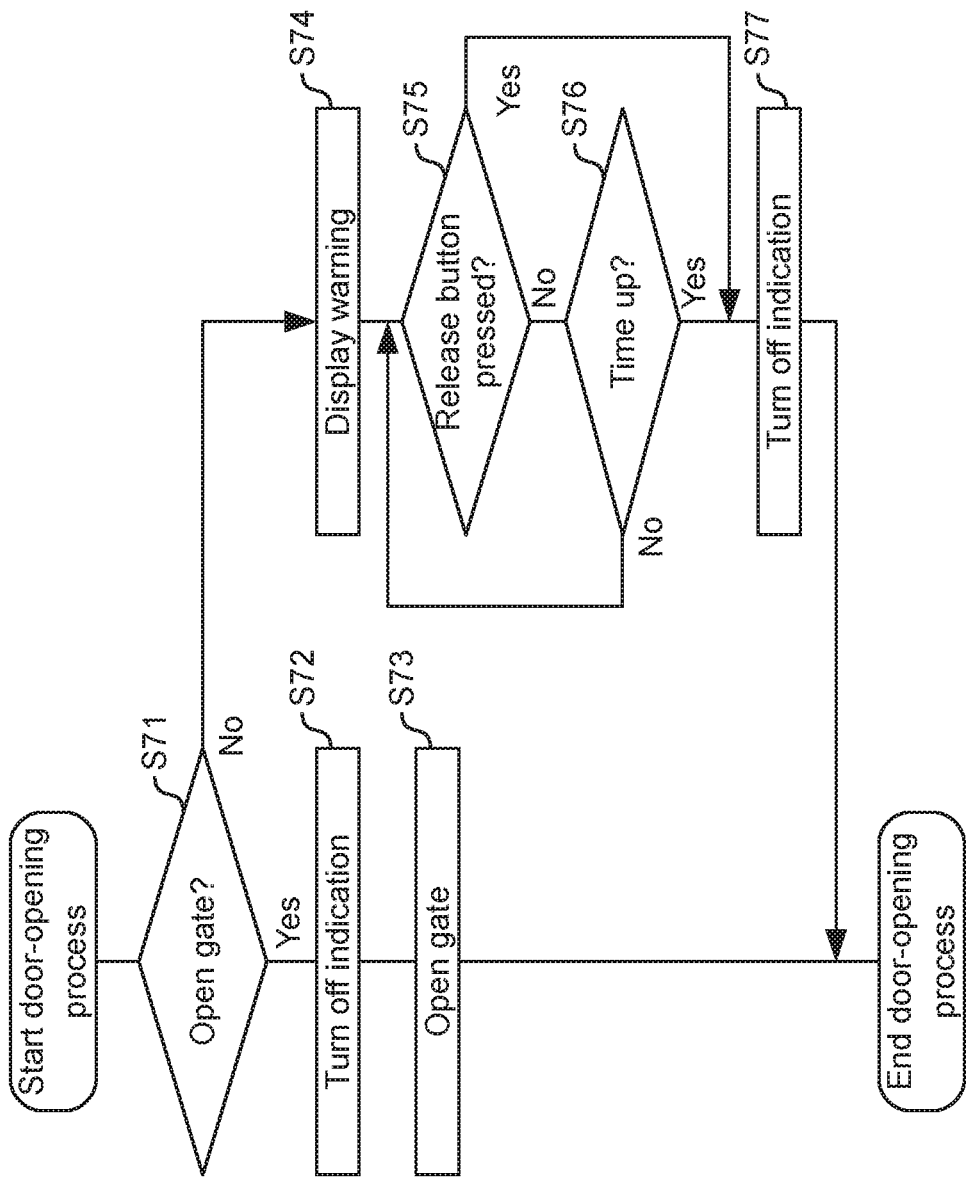
FIG. 7 is a flowchart showing a flow of a process related to a door-opening control process according to the present exemplary embodiment.

Next, a flow of a process related to the door-opening control process will be described. FIG. 7 is a flowchart showing the flow of the process related to the door-opening control process.

First, upon acquiring the information indicating the authentication result from the authentication request part 15, the opening-closing control part 16 determines whether or not to open the gate 2 on the basis of the information (S71). When the information indicating the authentication result is the permission information for permitting the gate 2 to be opened, the opening-closing control part 16 moves the process to S72. When the information indicating the authentication result is the non-permission information for not permitting the gate 2 to be opened, the opening-closing control part 16 moves the process to S74.

In S72, the notification control part 17 turns off the indication on the display 12. Subsequently, the opening-closing control part 16 opens the gate 2 (S73). On the other hand, the notification control part 17 changes the screen showing the process in progress to a screen showing the warning on the display 12, and causes the display 12 to display a release button (S74). Then, in step S75, the notification control part 17 determines whether or not the release button is pressed. Upon determining that the release button is pressed, the notification control part 17 moves the process to S77 and turns off the screen displayed on the display 12. Further, when the notification control part 17 determines that the release button is not pressed, the notification control part 17 moves the process to S76. Subsequently, the notification control part 17 determines whether or not the time is up because the predetermined time has elapsed from the point in time when the warning display screen was displayed in S74 (S76). The notification control part 17 moves the process to S77 when it determines that the time is up, and the notification control part 17 moves the process to S75 when it does not determine that the time is up.

Effect of the Present Exemplary Embodiment

As described above, in the gate control system S according to the present embodiment, the authentication device 3 specifies the card number of the credit card 5A of the user of the gaming facility, and performs a credit inquiry of the credit card 5A using the card number. Then, when the result of the credit inquiry indicates that using the credit card 5A is approved, the authentication device 3 opens the gate 2 via the gate control device 1.

In a credit inquiry of a credit card, using the credit card is not approved for a user who has been late in paying. Further, the possibility that a user who has been late in paying is tight on money is high. Furthermore, a user who intends to enter a gaming facility despite use of the credit card not being approved is likely to be suffering from gambling addiction because the user tries to enter the facility despite being tight on money. In this case, the gate control system S according to the present exemplary embodiment opens the gate only for a trustworthy user by utilizing the credit card authentication mechanism, and so it is possible to appropriately restrict the entrance of a user who is not suitable for entering a gaming facility such as a user who is likely to be suffering from gambling addiction or the like.

The present invention is explained with the exemplary embodiments of the present invention but the technical scope of the present invention is not limited to the scope described in the above embodiment. It is apparent for those skilled in the art that it is possible to make various changes and modifications to the embodiment. It is apparent from the description of the scope of the claims that the forms added with such changes and modifications are included in the technical scope of the present invention.

For example, in the above-described exemplary embodiment, an example is described in which the authentication processing part 32 in the authentication device 3 performs a credit inquiry of a user and determines whether or not to open the gate 2 in response to a request from the gate control device 1, but it is not so limited. The gate control device 1 may have the function of the authentication device 3, and the gate control device 1 may perform the credit inquiry of the user, and may determine whether or not to open the gate 2.

What is claimed is:

1. A method for controlling a gate for entering a facility comprising:
   acquiring a card number of a credit card of a user via a card reader of a gate control device of the facility;
   transmitting an authentication request from the gate control device to an authentication device, the authentication request comprising the card number;
   authenticating the card number of the credit card with the authentication device by performing a credit inquiry of the credit card using the card number;
   transmitting an authentication result from the authentication device to the gate control device, the authentication result comprising an indication of whether the user's use of the credit card is authorized or not, an indication of whether the user's use of the credit card was authorized or not during a first period before a time when the card number was acquired, and an indication of whether the credit card is expired or not; and
   opening the gate of the facility with the gate control device when the authentication result indicates the user's use of the credit card is authorized, the user's use of the credit card was authorized during the first period, and the credit card is not expired.

2. The method of claim 1, further comprising:
   acquiring a member identification number of a membership card of the user via the card reader of the gate control device of the facility.

3. The method of claim 1, wherein the gate of the facility is opened when the authentication device determines that the credit card is not expired even if an expiration date of the credit card was determined to have expired in the past and the authentication device updates the expiration date of the credit card associated with the card number in an authentication database.

4. The gate control method according to claim 1, wherein the gate of the facility is not opened when the user's use of the credit card is not authorized within a second period before a point in time when the card number was acquired even if it was determined that the credit card is not expired and the user's use of the credit card was authorized during the first period.

5. The gate control method according to claim 1, wherein the gate of the facility is not opened when a door-opening condition of the gate associated with the card number is not satisfied, even if it was determined that an expiration date of the credit card has not expired and the credit inquiry was performed within the first period.

6. The method of claim 5, wherein the authentication device transmits a notification of a reason for not opening the gate to the gate control device when the door-opening condition is not satisfied and the gate control device displays the reason on a display.

7. The method of claim 5, wherein
   the door-opening condition includes a self-control condition that can be set by the user, and
   the method further comprises the step of: receiving a setting of the self-control condition from the user.

8. The method of claim 5, the method further comprising the step of:
   receiving, at the authentication device, a scheduled time to enter the facility from the user and providing notification of information indicating whether or not entrance into the facility at the scheduled time of entry is possible on the basis of the door-opening condition.

9. The method of claim 5, the method further comprising the step of:
   providing notification that the user is in the gaming facility to a contact address of a partner of the user when the door-opening step determines whether or not to open the gate.

10. The method of claim 5, wherein
    the gate of the facility is not opened when an amount of money used by the user within a predetermined period in the facility and a credit limit of the credit card are within a predetermined range.

11. The method of claim 1, the method further comprising the step of:
    notifying the user that the credit inquiry of the credit card is required when a third period that is shorter than the first period has elapsed from a last credit inquiry of the credit card.

12. A method for controlling a gate for entering a facility comprising:
    acquiring a user identification information from a membership card of a user via a card reader of a gate control device of the facility;
    acquiring a card number of a credit card of a user associated with the user identification information from a database;

transmitting an authentication request from the gate control device to an authentication device, the authentication request comprising the card number;
authenticating the card number of the credit card with the authentication device by performing a credit inquiry of the credit card using the card number;
transmitting an authentication result from the authentication device to the gate control device, the authentication result comprising an indication of whether the user's use of the credit card is authorized or not, an indication of whether the user's use of the credit card was authorized or not during a first period before a timing when the card number was acquired and an indication of whether the credit card is expired or not; and
opening the gate of the facility with the gate control device when the authentication result indicates the user's use of the credit card is authorized, the user's use of the credit card was authorized during the first period, and the credit card is not expired.

* * * * *